Figure 1:
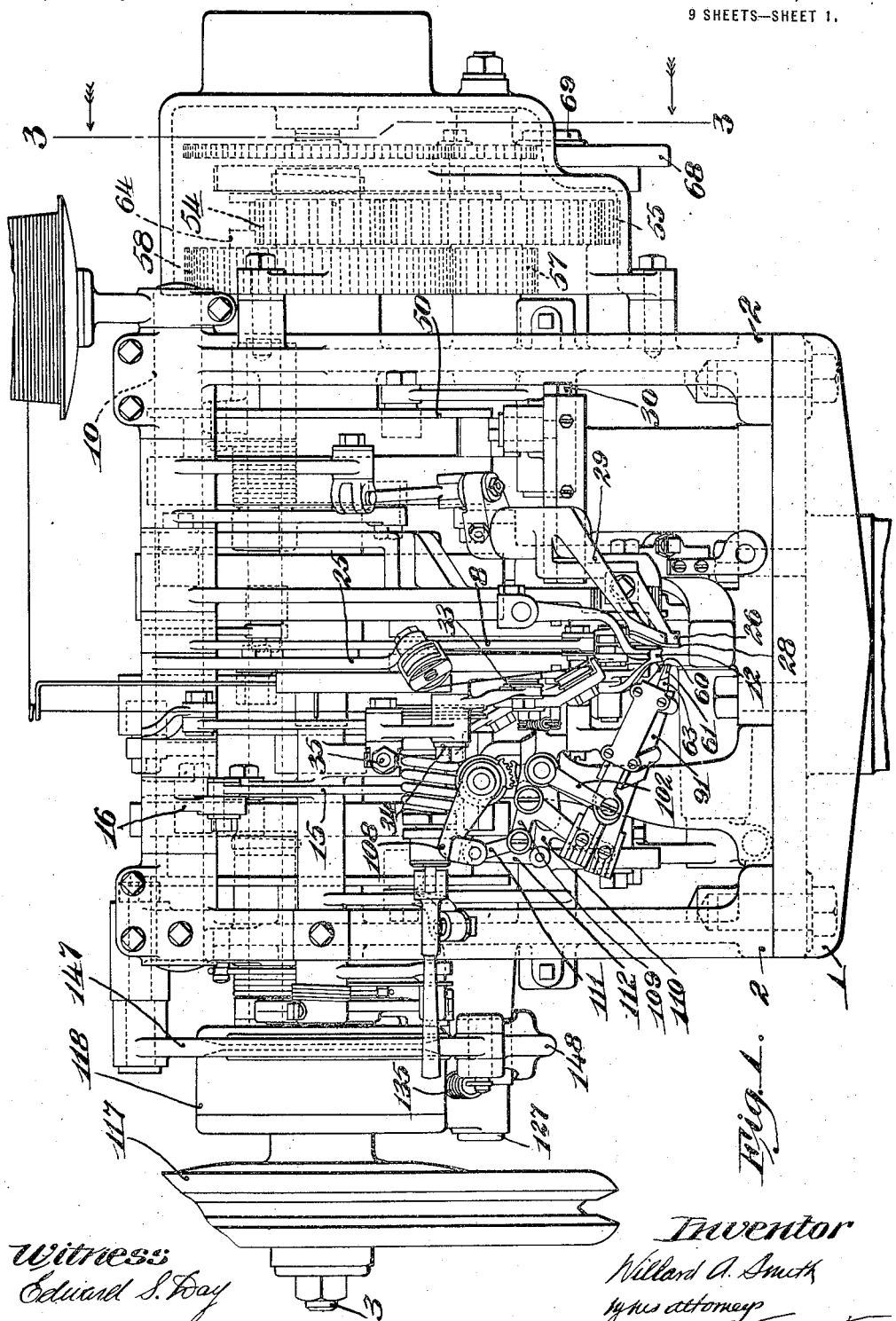

W. A. SMITH.
THREAD HANDLING MACHINE.
APPLICATION FILED AUG. 21, 1915.
1,356,795. Patented Oct. 26, 1920.
9 SHEETS—SHEET 4.
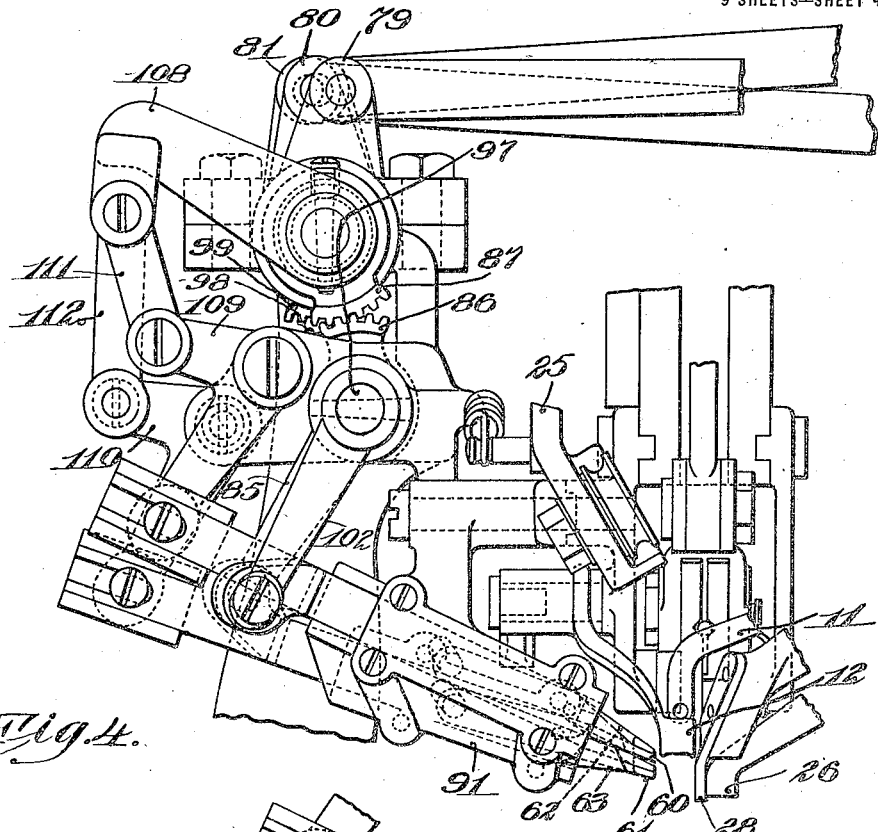
Fig. 4.
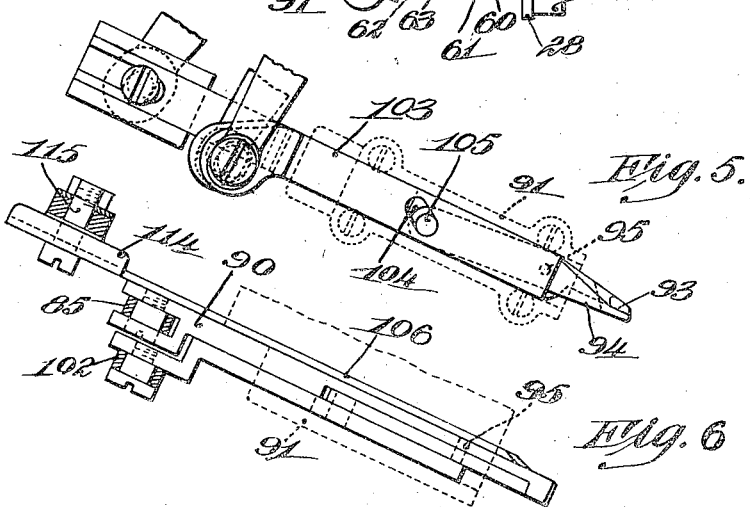
Fig. 5.
Fig. 6.
Witness
Edward S. Day
Inventor
Willard A. Smith
by his attorneys

W. A. SMITH.
THREAD HANDLING MACHINE.
APPLICATION FILED AUG. 21, 1915.

1,356,795.

Patented Oct. 26, 1920.
9 SHEETS—SHEET 5.

Witness
Edward S. Day

Inventor
Willard A. Smith
by his attorneys

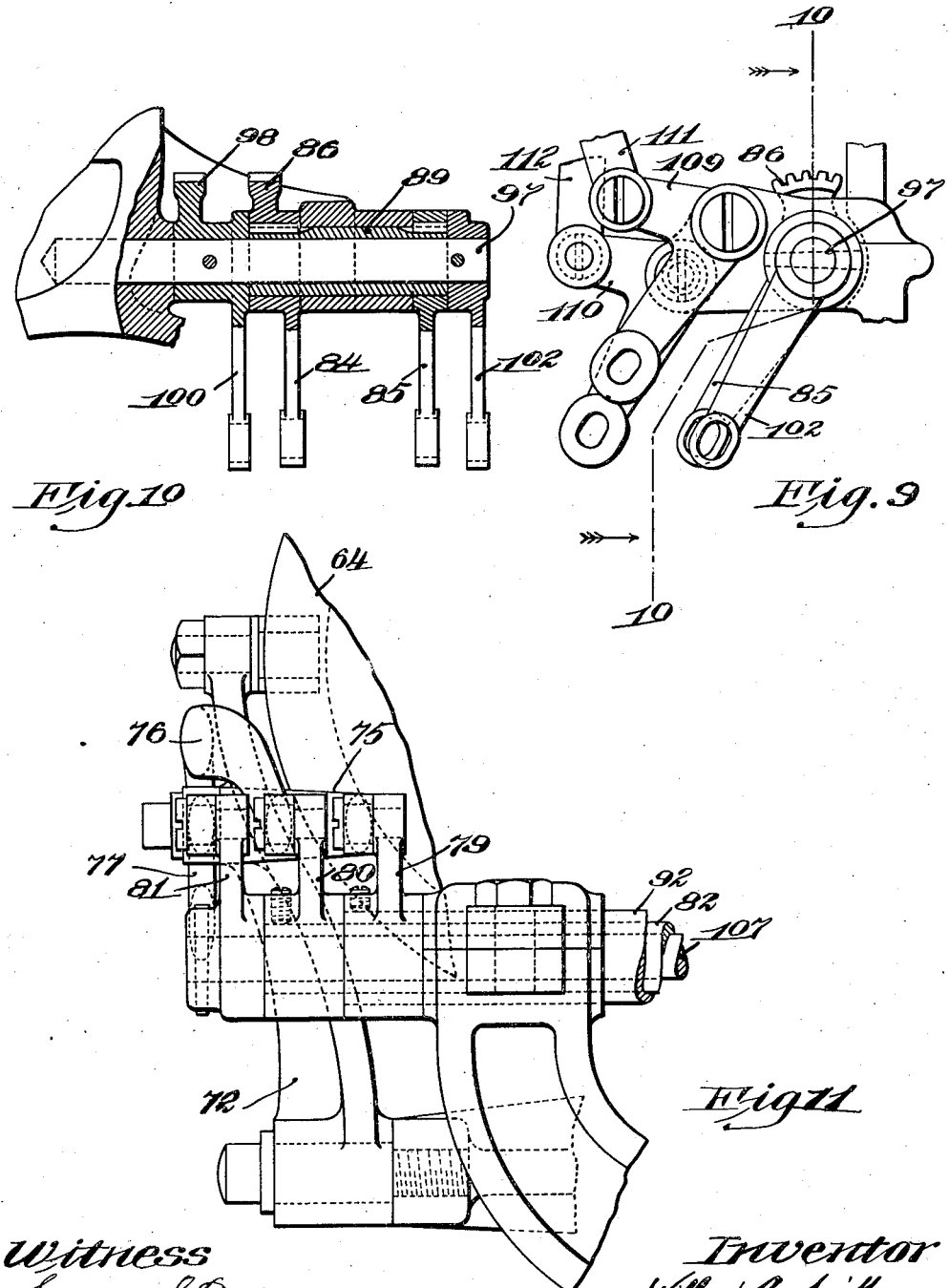

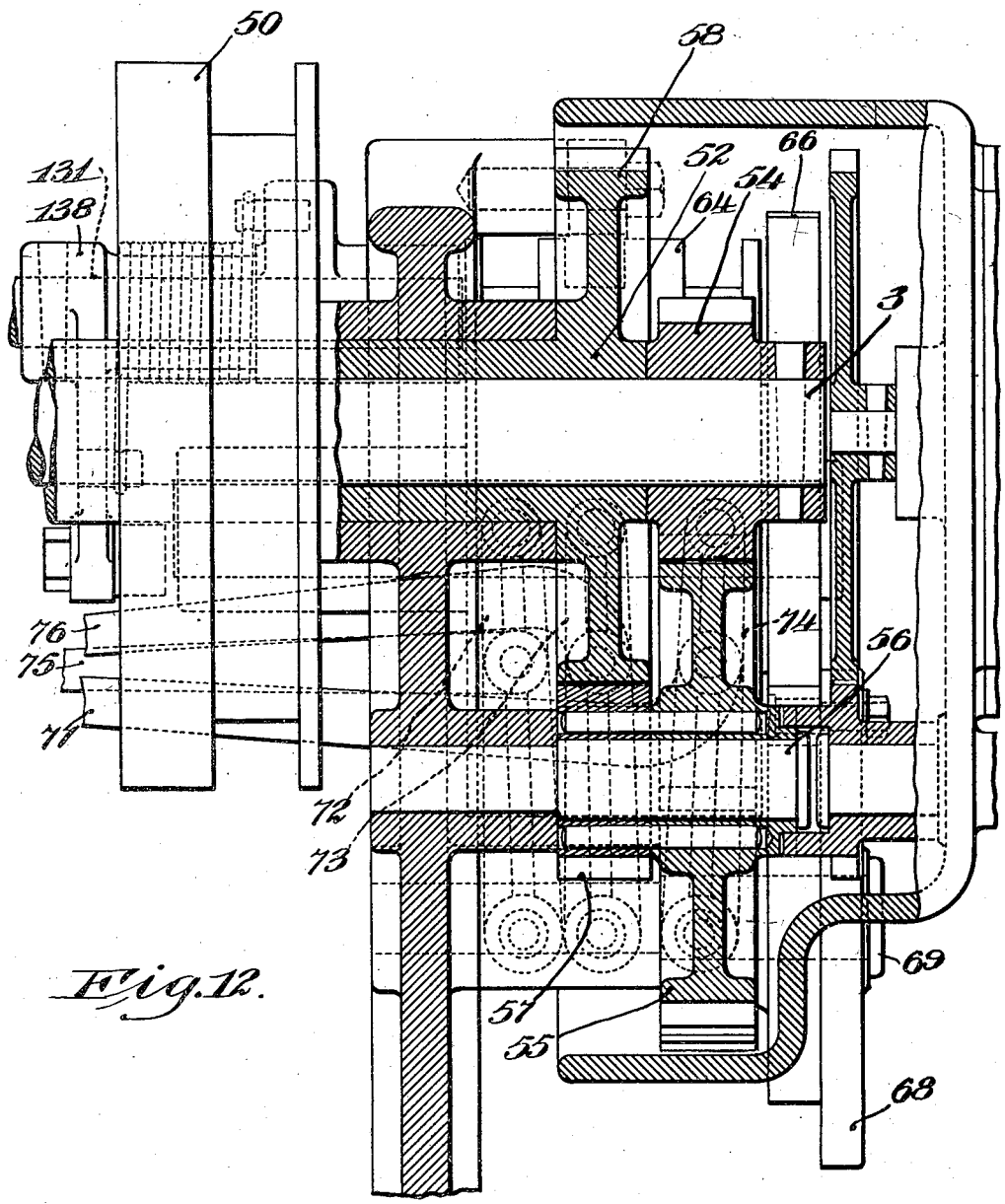

W. A. SMITH.
THREAD HANDLING MACHINE.
APPLICATION FILED AUG. 21, 1915.

1,356,795.

Patented Oct. 26, 1920.
9 SHEETS—SHEET 8.

Witness
Edward S. Day

Inventor
Willard A. Smith
by his attorneys
Phillips, VanEverent Fish

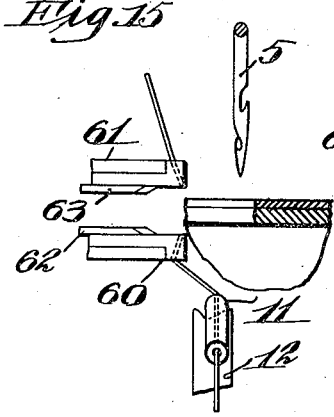
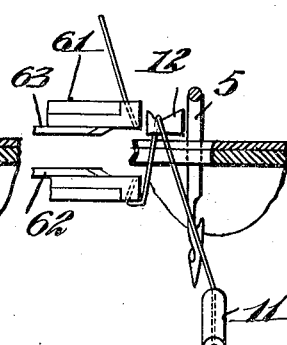
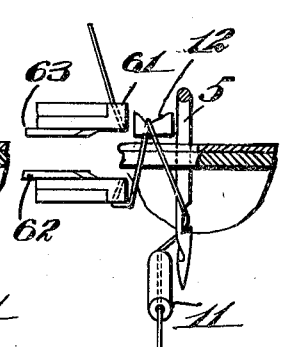
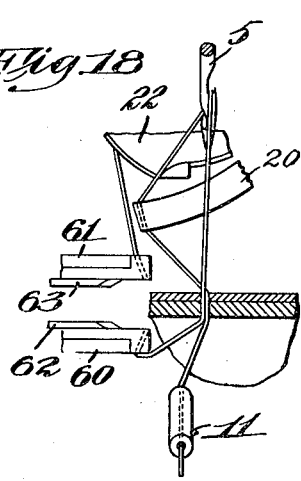
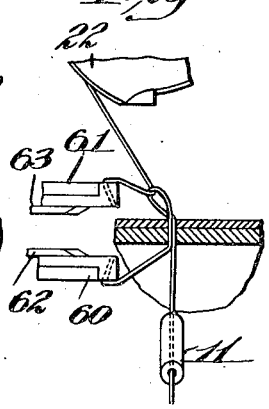
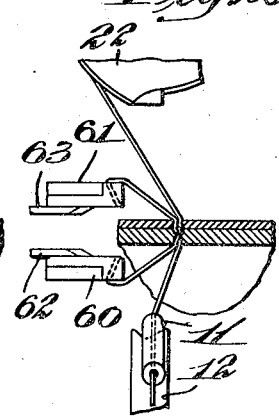
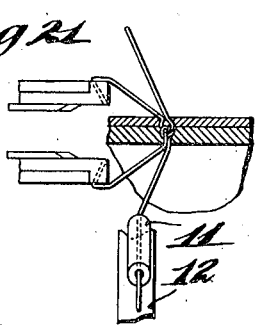
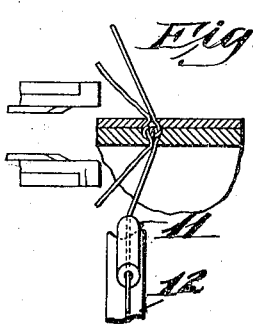
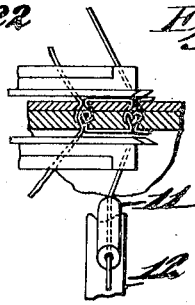

UNITED STATES PATENT OFFICE.

WILLARD A. SMITH, OF MELROSE, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

THREAD-HANDLING MACHINE.

1,356,795.

Specification of Letters Patent.

Patented Oct. 26, 1920.

Application filed August 21, 1915. Serial No. 46,632.

*To all whom it may concern:*

Be it known that I, WILLARD A. SMITH, a citizen of the United States, residing at Melrose, in the county of Middlesex and State of Massachusetts, have invented certain new and useful Improvements in Thread-Handling Machines; and I do hereby declare the following to be a full, clear, and exact description of the invention, such as will enable others skilled in the art to which it appertains to make and use the same.

The present invention relates to thread fastening machines and more particularly to machines of this type which are employed for securing the upper and sole of a lasted shoe together prior to the permanent securing of the inseam by a seam of connected thread stitches.

An object of the present invention is to provide an improved type of machine for inserting separate and independent thread fastenings which securely hold the upper and insole together. With this object in view the several features of the invention consist in certain novel features of construction, combinations and arrangements of parts hereinafter described and claimed, the advantages of which will be obvious to those skilled in the art from the following description.

The machine hereinafter described as embodying the present invention in its preferred form is similar in many respects to a well known type of inseam shoe sewing machine. In embodying the invention in this type of machine, certain constructions and arrangements of parts have been devised which are capable of use in thread handling machines provided with stitch forming and work feeding devices which form a continuous seam instead of separate and independent thread fastenings. This is especially true of the thread cutting and gripping or holding devices. Accordingly, certain features of the invention are not limited to thread handling machines which form and insert separate and independent thread fastenings, but, except where the limitation is especially stated in the claims, these features are intended to be applicable to thread handling machines, the stitch forming devices of which form a continuous seam as well as to those in which the stitch forming devices form separate and independent thread fastenings.

Figure 2:
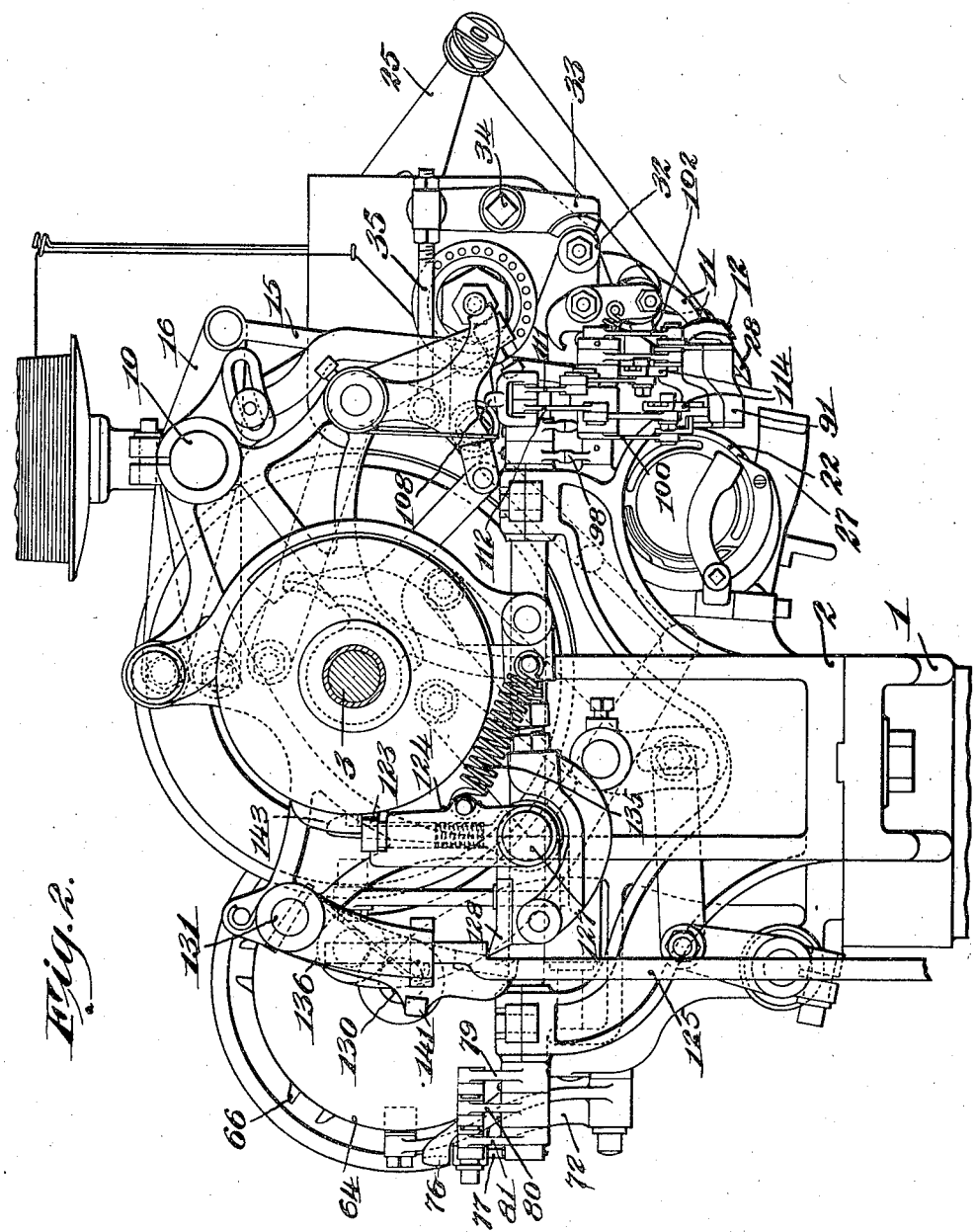
Figure 3:
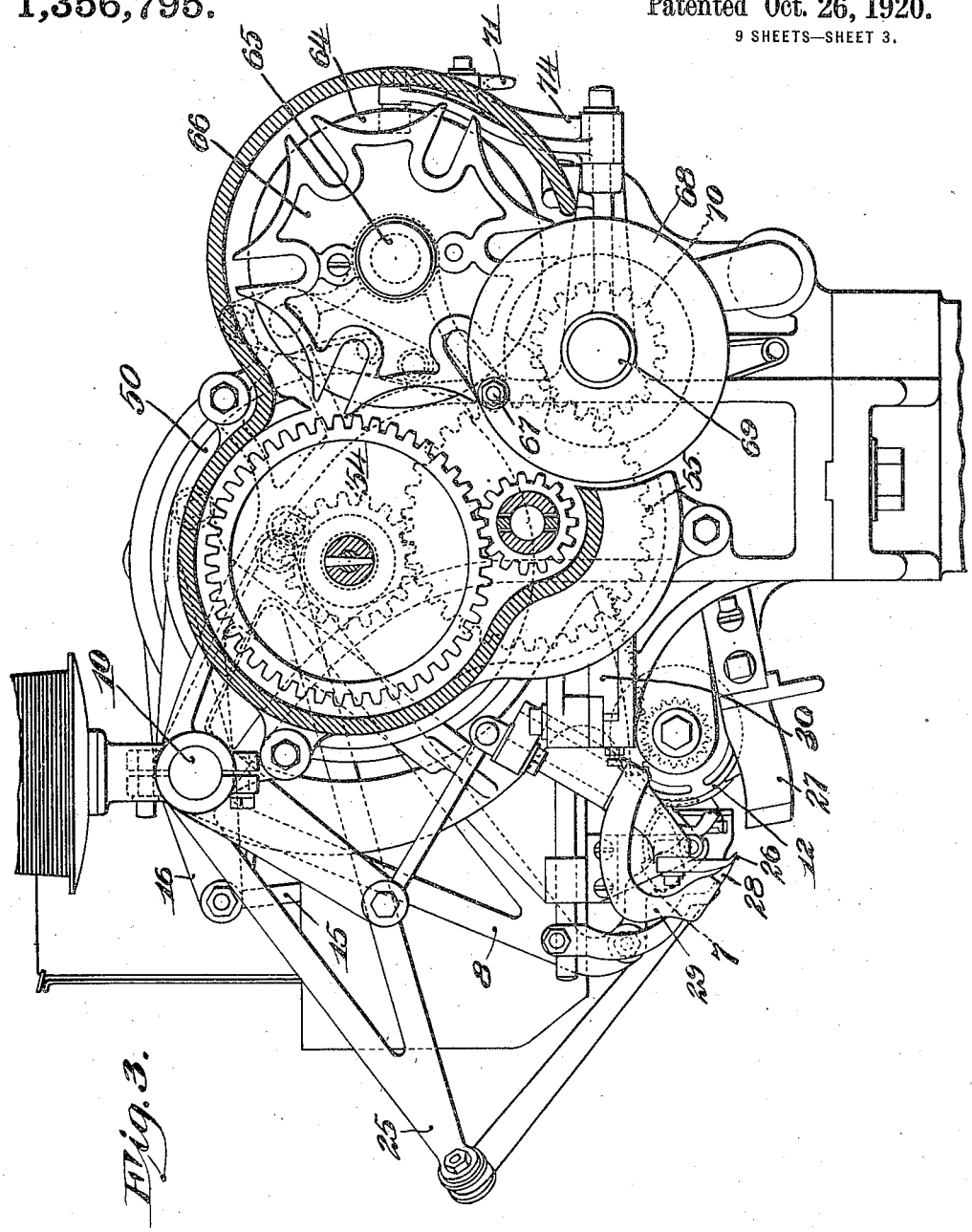
Figure 7:
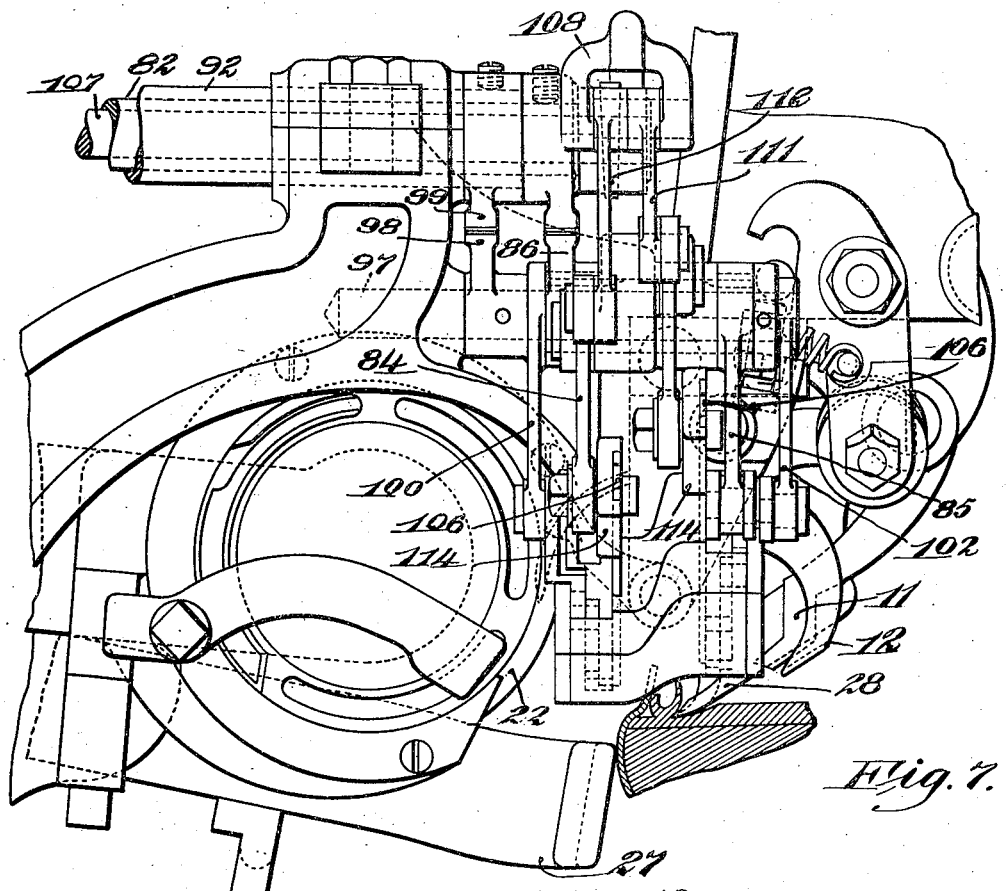
Figure 8:
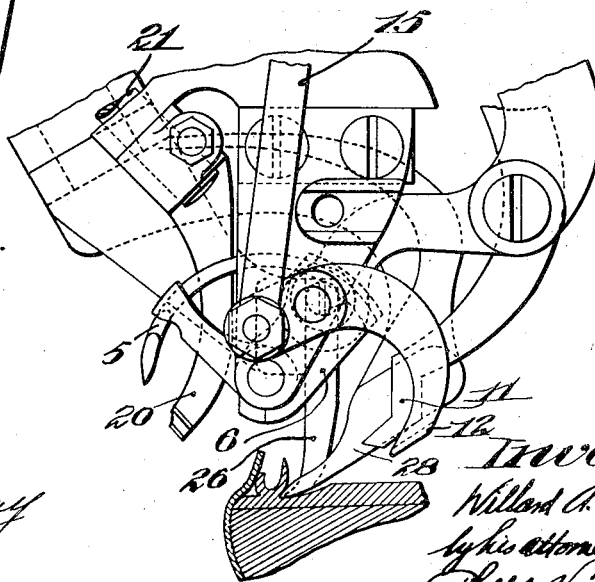
Figure 13:
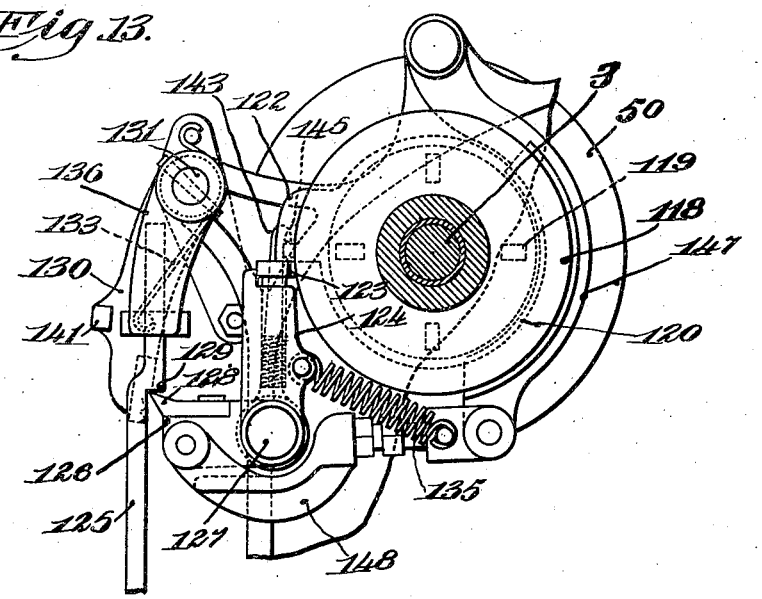
Figure 14:
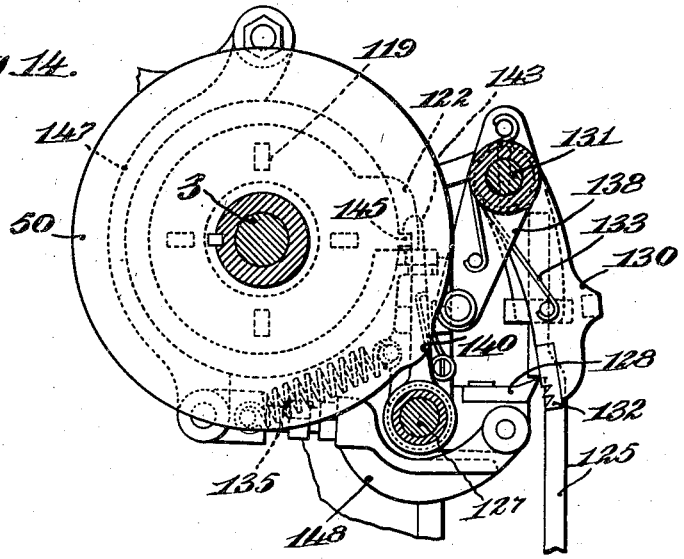

In the accompanying drawings illustrating the preferred form of the invention; Figure 1 represents a front elevation of a machine embodying the several features of the invention in their preferred form; Fig. 2 is a left-hand side elevation of the machine shown in Fig. 1; Fig. 3 is a section taken upon the line 3—3 of Fig. 1 looking in the direction of the arrows; Fig. 4 is a detail showing an elevation of the thread clamping and cutting mechanism; Figs. 5 and 6 are details illustrating upon an enlarged scale the thread cutting and clamping mechanism; Fig. 7 is a detail illustrating a side elevation upon an enlarged scale of the stitch forming mechanism; Fig. 8 is a detail showing an enlarged side elevation of the needle, looper and work positioning devices with the thread cutting and clamping mechanism removed; Fig. 9 is a detail showing a portion of the operating mechanism for the thread clamping and cutting devices; Fig. 10 is a section upon the line 10—10 of Fig. 9 looking in the direction of the arrows; Fig. 11 is a detail showing a portion of the operating mechanism for the thread clamping and cutting devices; Fig. 12 is a vertical sectional view of the driving mechanism illustrated in Fig. 3. Fig. 13 is a detail showing a right-hand side elevation partly in section of the one revolution clutch; Fig. 14 is a left-hand side elevation partly in section of the clutch shown in Fig. 13; Figs. 15 to 23, inclusive, are detail views partially diagrammatic, illustrating the formation of the thread fastening.

In the present invention the thread fastening is formed by knotting the opposite ends of a thread which is passed through the upper and insole lip of a lasted shoe at a plurality of points and finally severing the thread to form an independent fastening. In the simplest and most efficient form of the invention which has yet been devised needle and shuttle threads are employed and the adjacent ends of the two threads are tied together to form the knots, the threads then being severed after a single fastening has been completed.

As illustrated, the invention is embodied in a machine of the type shown and described in the patent to French and Meyer, No. 705,063, July 22, 1902, and that portion of the mechanism which is shown in this patent is only briefly described herein in consequence. The machine is supported upon a suitable standard indicated at 1 having a table or head 2 secured to its upper end in which the main drive shaft 3 is journaled. A curved hook needle 5 is carried by a needle segment 6 pivoted to the frame of the machine and connected by an actuating link 7 with an arm 8 loosely journaled upon a shaft 10 and having a rearward extension operatively connected with a face cam secured to the drive shaft 3. The thread is looped about the hook needle by a looper 11 which is actuated in the usual manner to loop the thread about the needle and cause the needle to pull the thread through the work when it is retracted. The needle thread is carried rearwardly from the looper by a thread finger 12 provided with a grooved end for receiving the thread and pivoted to the frame of the machine and connected in the usual manner through a link 15 with the front end of a lever 16 journaled upon the shaft 10 and operatively connected at its rear end to a face cam mounted upon the shaft 3. As shown clearly in Figs. 15 to 20 of the drawings the loop of thread is laid in the barb of the needle and the needle is then retracted to withdraw the loop of thread through the work after which one side of the loop is engaged by a loop spreader indicated at 20. The loop spreader is secured to the lower end of a shaft 21 which is actuated in the usual manner to cause the loop spreader to cross in front of the needle and engage the lower thread of the loop, moving it into a position to form a substantially triangular shaped loop which may be readily engaged by the beak of the loop taker or shuttle. The side of the loop which is held by the loop spreader is next engaged by the beak of an oscillatory loop taker or shuttle 22 which disengages the loop from the needle and loop spreader and passes it about the shuttle thread, leaving the needle and shuttle threads in substantially the position shown in Fig. 19 of the drawings. After the needle and shuttle threads have been interlocked the loop of needle thread is drawn into the work by a take-up consisting of an arm 25 having at its extremity a roll over which the thread passes, and fulcrumed upon the shaft 10, the take-up arm having a rearward extension which is connected with a suitable path cam to operate the take-up in the desired manner. The work positioning devices for clamping the shoe during the operation of the stitch forming mechanism comprise a channel guide 26 and a back gage 27 engaging upon opposite sides of the upper and insole lip of the lasted shoe. These coöperative members are moved toward and from one another in the usual manner to grip the work during the operation of the stitch forming mechanism and to release the work to permit the feed of the work for the formation of the next stitch. The feeding of the work is accomplished by a feeding finger 28 which engages with the channel of the shoe and is secured to the end of a curved arm 29 mounted upon a transversely movable feed slide 30. During the operation of the take-up the needle thread is clamped by a thread clamping member consisting of a grooved roll 32 over which the thread passes and a coöperating thread engaging finger 33 which is pivoted at 34 and is connected to suitable actuating mechanism through a link 35. It will be noted that according to the construction and mode of operation of this machine the needle and shuttle threads are interlocked and a half twist is imparted to the needle thread during the formation of each stitch.

According to the present invention the operation of locking the needle and shuttle threads is repeated a plurality of times while the work is held in a fixed position and the work is then fed the requisite distance after which the preceding operations are repeated. At the completion of the second operation the adjacent ends of the needle and shuttle threads are severed close to the work and the machine is automatically stopped. This mode of operation securely ties the adjacent ends of the needle and shuttle threads together and forms a thread fastening which firmly locks the upper and insole lip of the lasted shoe together. In the illustrated embodiment of the invention the adjacent ends of the needle and shuttle threads are conveniently tied together by imparting three complete movements to the stitch forming mechanism without feeding the work. The work is then fed, after which the cycle of operations of the stitch forming mechanism is repeated and the ends of the needle and shuttle threads are severed in close proximity to the work. This mode of operation is conveniently secured by imparting one complete rotation to the feeding cam 50 for six complete rotations of the main cam shaft 3. With this construction and mode of operation it will be noted that the needle, shuttle and coöperating stitch forming devices make six complete cycles of operation for each movement of the feeding finger. In order to accomplish this relative movement the feeding cam is secured to a sleeve 52 loosely journaled upon the cam shaft 3 and actuated therefrom through suitable reducing gears. As shown clearly in Figs. 3 and 12 of the drawings the cam shaft is provided with a driving pinion 54 which meshes with a driven gear 55 secured to a shaft 56. The shaft 56 carries a small driving pinion 57 which engages with and drives a large gear 58 formed integral with the sleeve 52. The feed cam is designed to actuate the feeding finger after the machine has been started and three cycles of the stitch forming mechanism have been completed.

At the completion of the thread fastening the ends of the needle and shuttle threads are severed in close proximity to the work and the loose ends leading to the supply are clamped in readiness to be engaged for the formation of the next thread fastening. To this end the machine is provided with thread clamping devices 60 and 61 which engage the needle and shuttle threads respectively, and thread cutting knives 62 and 63 which operate to sever the needle and shuttle threads in close proximity to the work. The thread cutting and clamping devices are actuated at predetermined intervals to clamp and sever the ends of the threads by a cam disk 64 mounted upon a shaft 65 and having three cam paths formed therein. The intermittent operation of the cam shaft 65 is conveniently accomplished by a Geneva gear indicated at 66 which is rotated intermittently by a stud 67 secured to a disk 68 mounted upon a shaft 69. The shaft 69 is rotated at a suitable rate of speed through a gear 70 secured to the shaft and meshing with the gear 55 supported upon the counter-shaft 56. The clamping and cutting devices are connected to the actuating cams by three arms 72, 73 and 74, respectively, which are pivoted at their lower ends upon the machine frame and are connected at their upper ends with the cam paths formed in the disk 64. The arms are connected respectively through links 75, 76 and 77 with rocker arms 79, 80, and 81, as shown clearly in Figs. 4 and 11 of the drawings. The three rocker arms serve respectively to actuate the thread cutting members, to open and close the gripping members, and to move the gripping members bodily into operative relation to the needle and shuttle threads. The bodily movement of the thread clamping devices to cause the thread clamping devices to engage with the needle and shuttle threads at the completion of the thread fastening is imparted by the rocker arm 80 which is secured to a sleeve 82 and actuates a pair of rocker arms 84 and 85 through intermeshing gear segments 86 and 87. The gear segment 86 is keyed to a sleeve 89 carrying the rocker arms and upon an oscillatory movement of the arm 80 the two arms 84 and 85 are rocked in unison to impart a bodily movement to the gripper members. The lower end of each rocker arm is connected with a slide 90 supported to move in a bearing 91 indicated in Figs. 4 and 5. The lower end of the slide 90 is provided with a lip 93 which forms one of the gripping jaws coöperating with a second gripping jaw 94 pivoted to the slide at 95, as shown clearly in Figs. 5 and 6 of the drawings. With this construction it will be noted that a movement of the rocker arm 80 causes a bodily movement of both slides to cause the gripper jaws to engage and release the supply and shuttle threads at the desired time. The two sets of gripping jaws are actuated by the rocker arm 79 which is secured to a sleeve 92 and is connected to a rock shaft 97 through intermeshing gear segments 98 and 99, as shown clearly in Figs. 4 and 10. The rock shaft 97 passes through the sleeve 89 and has rocker arms 100 and 102 secured thereto which are connected to each set of gripping jaws. Each rocker arm is pivoted at its lower end to a jaw actuating member 103 slidingly supported in the bearing 91 and having an oblique slot 104 which receives a stud 105 secured to the free inner end of the movable gripping jaw 94. With this construction, as the rocker arm is actuated to move the member 103 relative to the slide and gripping jaws the engagement of the oblique slot 104 with the pin 105 causes a relative oscillatory movement of the jaws about the fulcrum 95 to open and close the jaws. Each thread after being engaged and clamped by the gripping jaws is severed close to the jaws by a cutting blade 106 slidingly supported in the bearing 91 and arranged to shear the thread against the face of the gripping jaws where it emerges therefrom. Both cutting blades are actuated by the rocker arm 81 secured to a shaft 107 having a second rocker arm 108 extending from the opposite end. The rocker arm 108 is connected to a pair of bell crank levers 109 and 110 through links 111 and 112, respectively. The bell crank levers are respectively connected at their lower ends to the cutting blades 106 as shown clearly in Figs. 4, 5 and 6. In order to permit an adjustment of each knife blade relative to the operating mechanism the end of the blade is provided with a slotted block 114 which is adjustably secured to the lower end of the bell crank by a stud 115 in the usual manner. With this construction the gripping jaws and thread severing mechanisms are operated in timed relation to one another to first release the needle and shuttle threads to allow the work to be fed, to next advance and grip the needle and shuttle threads between the thread fastening and the supply after the fastening has been completed, and to finally sever the threads in close proximity to the work.

According to the present invention the machine is arranged to make one complete thread fastening and sever the thread, and is then automatically stopped and the work released in order that the shoe may be fed into position for the formation of the next succeeding fastening. To this end means are provided for causing the machine to automatically stop at the completion of a thread fastening with the various parts of the mechanism in position for the convenient removal of the work. It will be noted that for each cycle of operations necessary to form a complete thread fastening the feeding cam makes one complete rotation and according to the present invention this cam is conveniently utilized to control the stopping of the machine. The main driving pulley indicated at 117 is connected to the main drive shaft through a one direction clutch denoted generally at 118 and comprising a series of rolls 119 which are actuated in the usual manner to connect the drive pulley with the main drive shaft at predetermined intervals. The operation of the clutch is controlled by an annular ring 120 having a lateral projection 122 which engages with a spring pressed plunger 123 mounted in an arm 124, as shown clearly in Fig. 13 of the drawings. With the parts as shown in Fig. 13 the position of the annular ring is such that the clutch is inoperative and the drive pulley is disengaged from the shaft. In order to permit the operation of the clutch the arm 124 is moved to disengage the plunger 123 from the lateral projection 122. In order to accomplish this movement of the arm 124 it is connected with a treadle rod 125 through a second arm 126 extending from a rock shaft 127 and having a lip 128 which is engaged by a shoulder 129 formed upon the upper end of the treadle rod. With this construction upon a downward movement of the treadle rod the arm 124 is swung about the fulcrum 127 disengaging the plunger from beneath the projection. In order to retain the arm in this position for a predetermined length of time independently of the treadle, a locking arm 130 is supported upon a rock shaft 131 and is provided with a series of locking teeth 132 at its lower end which are arranged to engage the lip 128 when the arm 126 is swung downwardly. The arm 130 is normally retained in a locking position with relation to the arm 126 by a spring 133 surrounding the shaft 131 and tending to move the lower end of the arm inwardly, as shown in Fig. 13. During the time that the arm 126 is retained in its depressed position the clutch will continue to operate but upon releasing the arm 126 it is returned to its initial position by a spring 135 to move the arm 124 into the position shown in Fig. 13, causing the plunger to engage with the projection 122 and stop the machine at a predetermined time. In order to cause the stopping of the machine to take place automatically a disengaging arm 136 is supported upon the shaft 131 which has a second arm 138 secured to its opposite end engaging with the periphery of the awl feed cam 50. As shown clearly in Fig. 14 the periphery of this cam is provided with a raised portion 140 which serves to oscillate the arm 136 at the proper time into engagement with a lug 141 formed upon the locking arm 130 to cause the disengagement of the arm 130 from the arm 126. With this construction it will be noted that after the treadle is depressed the operation of the machine is started and continues during one complete rotation of the feed cam, after which the clutch is disengaged and the machine stopped at a predetermined point. In order to insure the stopping of the machine at a predetermined point and to prevent a rebound when the projection 122 engages with the spring pressed plunger 123 a hook 143 is mounted upon the arm 124 and engages with a lug 145 projecting from the ring 120, as shown clearly in Figs. 13 and 14. It is desirable that a brake be employed in connection with the operation of the clutch, the brake being applied upon disengaging the clutch and released upon engaging the clutch, as will be obvious to those skilled in the art. The brake is of the usual form indicated at 147 and is connected to the outer end of the arm 126 through a curved adjustable link 148, as shown clearly in Figs. 13 and 14. With this construction, when the arm is depressed to cause the engagement of the clutch the brake is released and when the arm is returned to its initial position the brake is again applied to stop the machine.

The operation of the improved machine is as follows: While the work is clamped in position by the back rest and channel guide, the stitch forming devices are actuated to loop the needle and shuttle threads a plurality of times. It will be noted upon referring to Figs. 15 to 23 inclusive, of the drawings, that the needle and shuttle threads are looped three times while the work is clamped in a fixed position. From an inspection of the above noted figures of the drawings it will be noted that the loop spreader engages with the rear side of the loop of thread held by the needle and in spreading the loop passes this thread behind and to one side of the opposite side of the loop, as shown clearly in Figs. 18 and 19, crossing the threads and imparting a half twist to the loop. After the shuttle has engaged with the loop thus spread to pass the needle thread over the shuttle thread, the loop of needle thread is drawn into the work in the manner shown in Fig. 20, leaving the loop of needle thread partially twisted. When the succeeding loops of thread are passed through the work at the same point this partial twist of each loop of needle thread causes the several loops to securely knot the adjacent ends of the thread together in a manner which effectually prevents releasing the ends of the threads. At the completion of the predetermined number of cycles of operation of the stitch forming devices the work is fed the requisite distance and the preceding cycles of operation are repeated. At the completion of the second cycle of operations the opposite ends of the two threads are firmly secured together to form a thread fastening which secures the upper and insole lip of the lasted shoe together and will not loosen under the continued strain of the upper. At the completion of the thread fastening the thread is clamped between the fastening and the supply and is then severed between the clamping members and the fastening in close proximity to the work. It will be obvious that with this mode of operation the needle and shuttle threads are always controlled and only sufficient thread for the formation of the thread fastening is employed.

While it is preferred to employ the specific construction and arrangement of parts shown and described, it will be understood that this construction and arrangement is not essential except so far as specified in the claims and may be changed or modified without departing from the broader features of the invention.

The invention having been described, what is claimed is:

1. A thread fastening machine having, in combination, work positioning devices including a back gage and channel guide, thread handling devices, and mechanism for actuating the thread handling devices to pass a thread through the work and to knot the opposite ends of the thread to secure the thread in the work.

2. A thread fastening machine having, in combination, work positioning devices including a back gage and channel guide, thread handling devices, mechanism for actuating the thread handling devices to pass a thread through the work and to knot the opposite ends of the thread to secure the thread in the work, and mechanism for severing the thread at the completion of the thread fastening.

3. A thread fastening machine having, in combination, work positioning devices including a back gage and channel guide, thread handling devices, mechanism for actuating the thread handling devices to pass a thread through the work and to knot the opposite ends of the thread to secure the thread in the work, mechanism for severing the thread, and mechanism for stopping the machine at the completion of the thread fastening.

4. A thread fastening machine having, in combination, work positioning devices including a back gage and channel guide, stitch forming devices including a needle and a shuttle, mechanism for actuating the stitch forming devices to knot the needle and shuttle threads together at a plurality of points, and mechanism for severing the adjacent ends of the needle and shuttle threads at the completion of the thread fastening.

5. A thread fastening machine having, in combination, thread handling devices including a needle and shuttle, work positioning devices, and mechanism for actuating the thread handling devices and work positioning devices to interlock a plurality of loops of the needle and shuttle threads while the work is clamped in a fixed position, to feed the work, and to again interlock a plurality of loops of the needle and shuttle threads while the work is clamped.

6. A machine for inserting a thread fastening through the upper and insole lip of a lasted shoe having, in combination, work positioning devices including a back gage and channel guide, stitch forming devices, mechanism for actuating the stitch forming devices to interlock a plurality of loops of the needle and shuttle threads and to pull each loop into the work while the work is stationary, and means for feeding the work after a plurality of loops have been interlocked.

7. A thread fastening machine comprising stitch forming devices, including a needle and a shuttle, a pair of thread clamps positioned upon opposite sides of the work and arranged to engage respectively with the needle and shuttle threads, and mechanism for actuating the thread clamps to clamp the threads at the completion of the fastening.

8. A thread fastening machine comprising a gripping jaw, a coöperating jaw pivotally connected therewith, mechanism for relatively actuating the two jaws to grip a thread between them, a thread cutting device slidably supported in operative relation to the jaws, and mechanism for actuating the thread cutting device in the direction of its length to shear the thread against the gripping jaw.

9. A thread fastening machine having, in combination, stitch forming devices, mechanism for actuating the stitch forming devices, a feeding finger, a cam operatively connected with the finger and arranged to cause a single feed movement of the finger for each rotation of the cam, and mechanism controlled by the cam for imparting one complete rotation to the cam and for stopping the machine automatically at the completion thereof.

10. A thread fastening machine comprising stitch forming devices, a cam shaft, connections between the cam shaft and stitch forming devices, a feed cam, and reducing gears operatively connecting the cam shaft and feed cam.

11. A thread fastening machine comprising stitch forming devices, a cam shaft, connections between the cam shaft and stitch forming devices, thread clamping and cutting devices, a cam for operating the clamping and cutting devices, and connections between the cam shaft and cam for intermittently rotating the cam during the continuous rotation of the cam shaft.

12. A thread fastening machine comprising a feed cam, a one direction clutch, means under the control of the operator for engaging the clutch to start the machine, mechanism for permitting the engagement of the clutch for a predetermined length of time, and mechanism controlled by the feed cam for disengaging the clutch.

13. A thread fastening machine, having in combination, work positioning devices comprising a back gage and channel guide, stitch forming devices comprising a needle and a shuttle, mechanism for actuating the stitch forming devices to loop the needle and shuttle threads and to impart a partial twist to the needle thread, and mechanism for imparting a plurality of cycles of operation to the stitch forming devices while the work is held stationary.

14. A thread fastening machine, having in combination, work positioning devices, stitch forming devices including a needle and a shuttle, mechanism for spreading the loop of thread formed by the needle and for partially twisting the loop, mechanism for feeding the work, and mechanism for actuating the needle and shuttle to form a plurality of loops of the needle and shuttle threads while the work is stationary.

15. A thread handling machine having, in combination, work positioning devices and thread fastener forming and inserting devices constructed and arranged to pass a plurality of loops of thread through the upper and insole lip of a lasted shoe at each of a plurality of points and to knot this thread at each of these points with a second thread upon the opposite side of the work.

16. A thread handling machine having, in combination, stitch forming and work feeding devices including a curved hook needle and a looper, work positioning devices and means acting automatically to sever and hold the needle thread as the machine is stopped after a plurality of cycles of operation of the stitch forming devices.

17. A thread handling machine having, in combination, stitch forming and work feeding devices including a curved hook needle and a looper, work positioning devices, and means acting automatically to sever the needle thread and hold it between the looper and the work as the machine is stopped after a plurality of cycles of operation of the stitch forming devices.

18. A thread handling machine having, in combination, stitch forming and work feeding devices including a curved hook needle and a looper arranged to form stitches in the upper and insole of a lasted shoe, devices for engaging and positioning the shoe with relation to the stitch forming devices, and means acting automatically to sever the needle thread and hold it between the looper and the work as the machine is stopped after a plurality of cycles of operation of the stitch forming devices.

19. A thread handling machine having, in combination, stitch forming and work feeding devices including a curved hook needle and a looper, work positioning devices and means acting automatically to sever the needle thread as the machine is stopped after a plurality of cycles of operation of the stitch forming devices.

20. A thread handling machine having, in combination, stitch forming and work feeding devices including a curved hook needle and a looper arranged to form stitches in the upper and insole of a lasted shoe, devices for engaging and positioning the shoe with relation to the stitch forming devices, and means acting automatically to sever the needle thread as the machine is stopped after a plurality of cycles of operation of the stitch forming devices.

21. A thread handling machine having, in combination, stitch forming and work feeding devices including a curved hook needle and a looper, work positioning devices, and means acting automatically to engage and hold the thread between the looper and the work as the machine is stopped after a plurality of cycles of operation of the stitch forming devices.

22. A thread handling machine having, in combination, stitch forming and work feeding devices including a hook needle, a looper, and a loop taker or shuttle and thread severing and holding means arranged to sever the needle thread and to hold it between the looper and the work and to sever and hold the locking thread on the opposite side of the work.

23. A thread handling machine having, in combination, work feeding and stitch forming devices including a hook needle, a looper and a loop taker or shuttle, and means for severing and holding the needle and shuttle threads as the machine is stopped after a plurality of cycles of operation of the stitch forming devices.

24. A thread handling machine having, in combination, stitch forming and work feeding devices including a hook needle, a looper and a loop taker or shuttle and thread severing and holding means arranged to sever the needle thread between the looper and the work and to sever and hold the shuttle thread on the opposite side of the work as the machine is stopped after a plurality of cycles of operation of the stitch forming devices.

25. A thread handling machine having, in combination, stitch forming and work feeding devices including a hook needle, a looper and a loop taker or shuttle, and means acting automatically to sever the shuttle thread as the machine is stopped after a plurality of cycles of operation of the stitch forming devices.

26. A thread handling machine having, in combination, work feeding and stitch forming devices including a hook needle, a looper and a loop taker or shuttle, and means for severing the needle and shuttle threads as the machine is stopped after a plurality of cycles of operation of the stitch forming devices.

27. A thread handling machine having, in combination, work feeding and stitch forming devices including a hook needle, a looper and a loop taker or shuttle, and means acting automatically to engage and hold the shuttle thread between the shuttle and the work as the machine is stopped after a plurality of cycles of operation of the stitch forming devices.

28. A thread handling machine having, in combination, work feeding and stitch forming devices including a hook needle, a looper and a loop taker or shuttle, and means acting automatically to engage and hold the needle and shuttle threads as the machine is stopped after a plurality of cycles of operation of the stitch forming devices.

WILLARD A. SMITH.